Nov. 8, 1938.　　　　M. T. GOETZ　　　　2,136,048

DUAL MAGAZINE CONTROL

Filed Dec. 30, 1935　　　3 Sheets-Sheet 1

INVENTOR
MAURUS T. GOETZ

BY H.B. Whitfield
ATTORNEY

Nov. 8, 1938.    M. T. GOETZ    2,136,048
DUAL MAGAZINE CONTROL
Filed Dec. 30, 1935    3 Sheets-Sheet 2

INVENTOR
MAURUS T. GOETZ
BY H. B. Whitfield
ATTORNEY

Nov. 8, 1938.　　　　　M. T. GOETZ　　　　　2,136,048
DUAL MAGAZINE CONTROL
Filed Dec. 30, 1935　　　　3 Sheets-Sheet 3

INVENTOR
MAURUS T. GOETZ
BY *J. H. B. Whitfield*
ATTORNEY

Patented Nov. 8, 1938

2,136,048

UNITED STATES PATENT OFFICE 2,136,048

DUAL MAGAZINE CONTROL

Maurus T. Goetz, Chicago, Ill., assignor, by mesne assignments, to Teletypesetter Corporation, a corporation of Delaware Application December 30, 1935, Serial No. 56,608

18 Claims. (Cl. 199—19)

This invention relates to linecasting and composing machines, and particularly to the control of auxiliary functions of composing machines by an automatic control unit responsive to stored signals.

An object of the invention is to provide a simple and reliable mechanism responsive to stored signal conditions for performing certain auxiliary functions of linecasting machines.

A feature of the invention is the provision of universal control means responsive to selectable elements under the control of stored signals for the magazine shift functions of commercial linecasting machines.

The invention also features an arrangement for suspending the operation of a stored signal sensing apparatus during a magazine shift operation, an arrangement for rendering the operation control unit non-responsive to repeated identical magazine shift signals, and an arrangement for preventing such a repeated identical shift signal from effecting a full length suspension in the operation of the stored signal sensing apparatus.

Briefly, the invention includes a plurality of levers to be actuated by pull bars which are conditioned to respond to certain settings of code elements, the positioning of which is regulated by stored signals in a storing medium. A lever, when actuated by its associated pull bar, operates through appropriate linkage to establish driving connection between a continuously driven shaft and a cam. The cam, through a suitable follower, actuates the magazine shift control of the associated composing machine, which may operate directly to accomplish the shift function, or may set in operation power actuated means for accomplishing the shift function, as the composing machine to which the invention is applied may be of either type.

In order to restore the original relationship between the composing machine and its magazines, another pull bar may be selected in response to another signal condition. The selected pull bar actuates a lever to control a clutch which connects a cam to a power driven shaft, and a cam follower therefor effects an opposite shift action to restore the magazines to their previous position.

In certain of the commercially available composing machines the element which controls a magazine shift function has a normal position to which it returns after being actuated, so that its operation is always the same regardless of the associative relation between magazines and composing machine. In order that one or more repetitions of a particular shift signal shall not initiate a shift operation, and in order that the pull bars associated with the shift signals may be brought into association with the shift control of the composing machine sequentially, the invention includes an arrangement providing a shift in the linkage between the pull bars and the cam clutch control levers, and wherein the linkage shift occurs concurrently with a magazine shift.

The levers actuated by the pull bars, in addition to establishing driving connection in the cam operating clutch, also actuate linkage to suspend the operation of the stored signal sensing mechanism of the automatic control unit. The sensing mechanism is restored to operation by a cam follower which follows a cam associated with the driven portion of the clutch. In the preceding paragraph, the arrangement for preventing repeated identical shift signals from effecting a shift operation has been described. Since such a signal would permit the pull bar associated therewith to operate, the operation of the signal sensing mechanism will be suspended. Cam operated levers are provided for restoring the sensing mechanism to operating condition, and the interval of delay may be of any desired duration, depending upon the position of the apex of the cam which operates the restoring levers.

For a complete understanding of the invention, reference may be had to the following description taken in connection with the accompanying drawings in which—

Fig. 4 shows the control unit portion of Fig. 3 as applied to still another form of principal machine.

Figure 1:
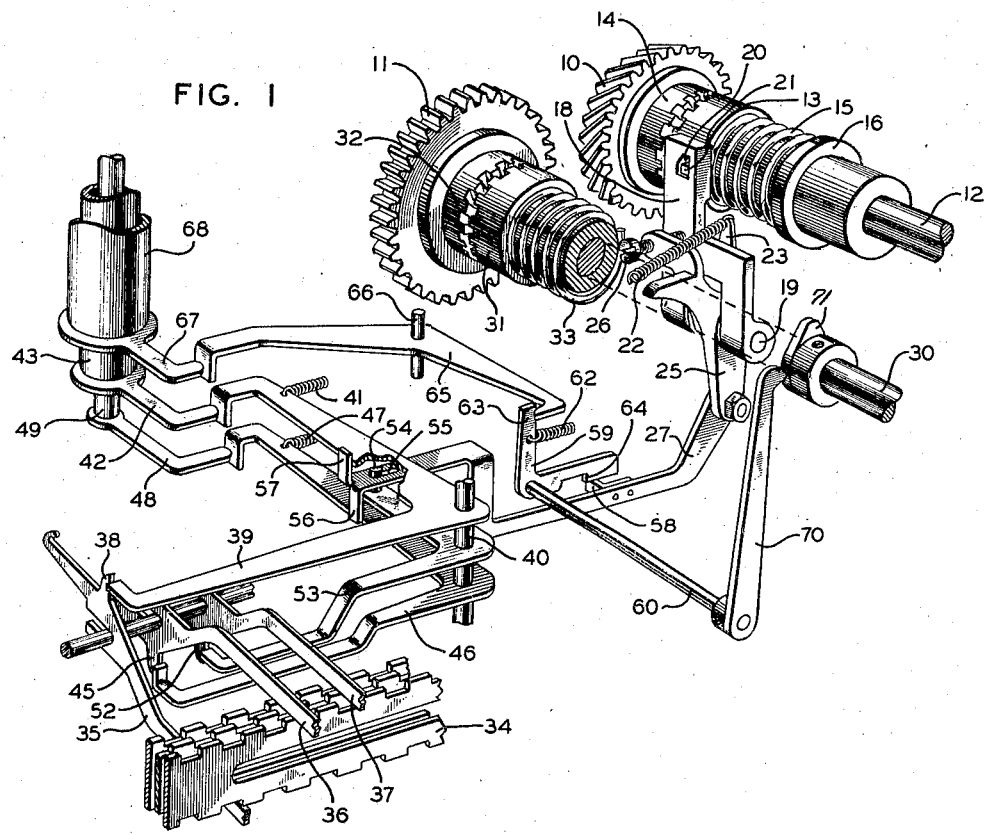
Fig. 1 is a schematic view in perspective of that portion of an automatic control unit which may be applied to all types of principal machines.
Figure 2:
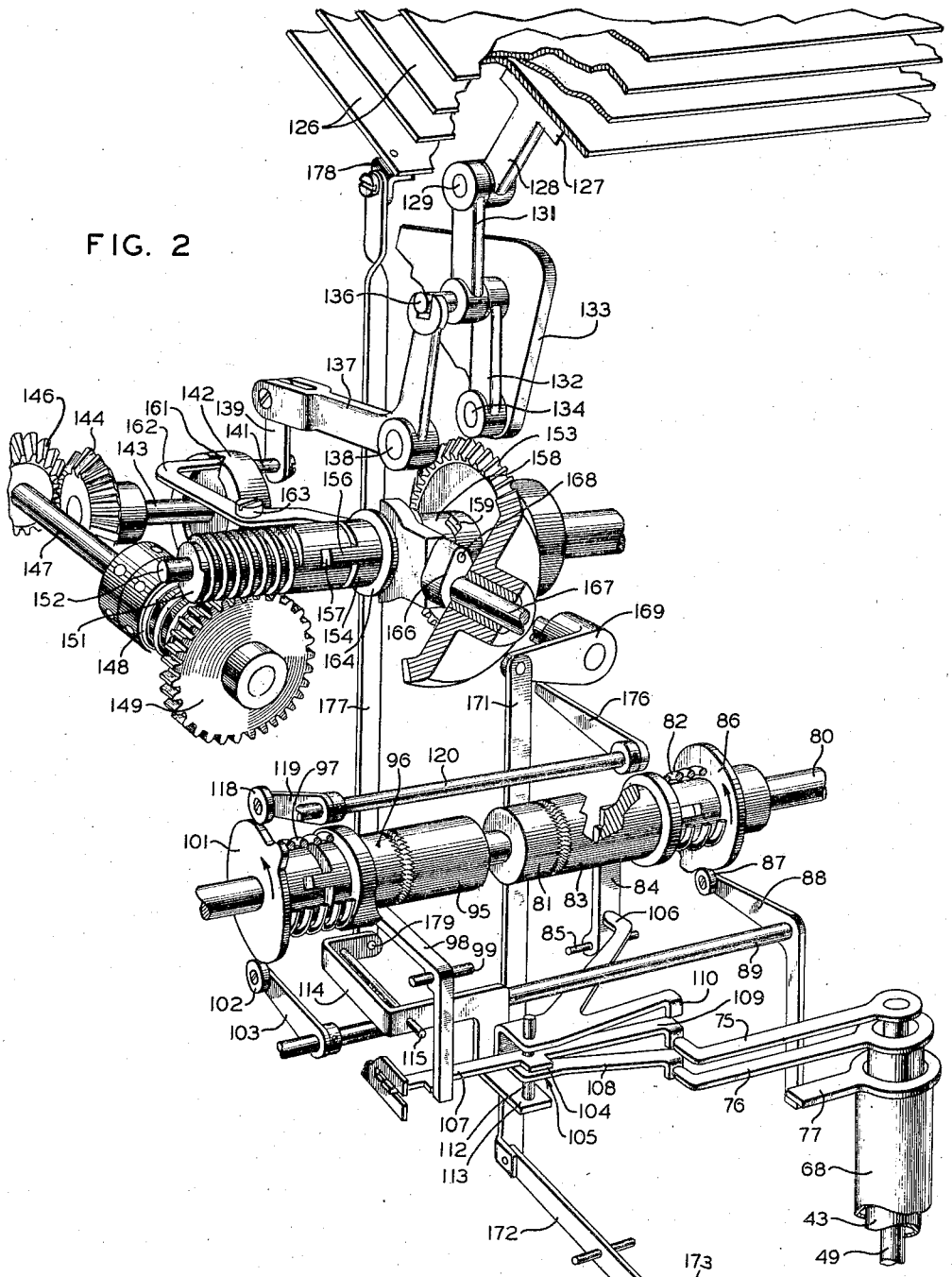
Fig. 2 is a schematic view in perspective of one form of principal machine having associated therewith that portion of the automatic control unit which is peculiarly adapted to that type of principal machine.
Figure 3:
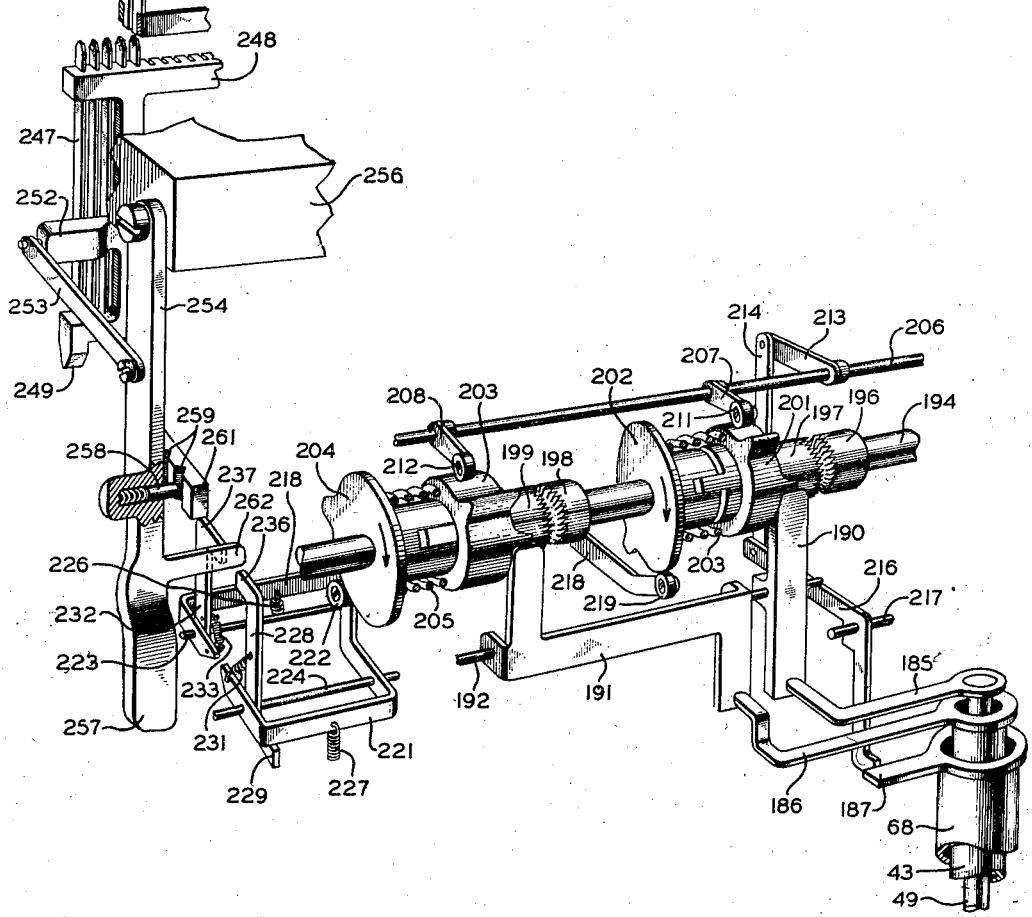
Fig. 3 is a schematic view in perspective of another form of principal machine having associated therewith a modified form of a portion of automatic control unit which is peculiarly adapted to the principal machine shown.

It may be added, with general reference to the drawings, that there is an operative relation between the apparatus shown in Fig. 1, and those shown in Figs. 2 and 3 which may be observed by positioning either of the last mentioned figures with respect to Fig. 1 so that the extreme right-hand lower elements of Fig. 2 or Fig. 3 are in alignment with the upper left-hand elements of Fig. 1. From such an arrangement, it immediately becomes apparent that each pair of aligned elements is, in reality, a single element.

For convenience in describing the present invention, the standard structures of well-known commercial linecasting and composing machines, as illustrated in the accompanying drawings, will be referred to hereinafter as the principal machines, while the mechanism which is operative for initiating the magazine shift function and other functions of a principal machine will be referred to hereinafter as the control unit.

In the drawings, only as much of the machanism of the principal machine has been shown as is deemed necessary to disclose clearly the cooperation of the automatic control unit therewith.

For a full and complete understanding of one form of selecting device which may be employed for initiating the operation of the control unit which also forms the subject matter of this invention, reference may be had to Patent No. 2,091,286, granted August 31, 1937 to Howard L. Krum et al.

Referring now to the drawings in which like reference characters designate corresponding parts throughout the several views and particularly to Fig. 1, the reference numerals 10 and 11 designate power driven gears contained in an automatic control unit for a linecasting machine. The gears 10 and 11 may be driven from any convenient source of power in the principal machine such as the so-called intermediate shaft, whereby predetermined rotational velocities may be imparted to them. The gear 10 is loosely mounted on a shaft 12 which also carries slidable thereon and incapable of independent rotation with respect thereto, a clutch member 13 which is intended for cooperation with a similar clutch member 14 fixed to and rotatable with the gear 10. A compression spring 15 which surrounds the shaft 12 and is confined between the clutch member 13 and a collar 16, urges the clutch member 13 into engagement with the clutch member 14 when the member 13 is not restrained from movement into engagement with the member 14 by reason of the clutch throw-out lever 18 which is pivotally supported on pivot pin 19 and which is provided with an aperture 20 for cooperation with a clutch throw-out dog 21 carried by the driven clutch member 13. The clutch throw-out lever 18 is normally urged out of engagement with the throw-out dog 21 by reason of the tension spring 22 connected to lug 23 carried by the throw-out lever 18. A lever 25, having adjustable clutch throw-out lever engaging screw 26 is pivotally mounted on the pivot pin 19 and is articulated to a link 27 by a reciprocating action of which it may cause the clutch throw-out lever 18 to engage the throw-out dog 21 and disconnect the shaft 12 from the continuously rotating gear 10 for a reason and in a manner which will be described hereinafter.

The clutch throw-out lever 18 may also be actuated to cause driven member 13 to become disengaged from driving member 14 by means of a manual control device not shown or described herein but fully and completely shown and described in the above-mentioned Patent No. 2,091,286. In Fig. 1, clutch members 13 and 14 have been shown disengaged, as if by said manual control device, in order that the drawings shall uniformly disclose all of the mechanism in idle or rest condition.

The gear 11 is freely mounted upon the shaft 30 and may be connected thereto to drive the shaft 30 by clutch members 31 and 32 which correspond to previously described clutch members 13 and 14 respectively. A compression spring 33 similar to the compression spring 15 urges the driven portion of clutch 31 into engagement with the driving portion 32 when the driven portion is not restrained by a clutch throw-out lever (not shown) similar to clutch throw-out lever 18.

The shaft 12 may be designated a record reader shaft and its functions are to control the sensing of a signal storage device (not shown) and the setting of code bars 34 in accordance with the stored signals presented to the record reader sequentially by the signal storage device. The shaft 30 is an elevator operating shaft and is employed for operating the assembler elevator of a principal machine in response to predetermined signals presented to the record reader. All of the elements described and identified by reference characters up to this point are shown and described in the hereinbefore mentioned Patent No. 2,091,286, from which a full and complete understanding of the relationship between elements shown in the drawings and others mentioned herein but not shown in the drawings, may be gained.

The code bars 34 control the selection of numerous selectable elements, of which the selectable bars 35, 36, and 37 are examples. The selectable element 35 has a shoulder 38 which operatively engages one end of a bell crank lever 39 pivotally mounted on the shaft 40 and normally urged in a clockwise direction by the tension spring 41. The other end of the bell crank lever 39 is in operative engagement with an arm 42 carried by a hollow shaft 43. The selectable element 36 has a shoulder 45 which operatively engages one end of a bell crank lever 46 also pivoted on the shaft 40 and normally urged in a clockwise direction by spring 47. The other end of the bell crank lever 46 operatively engages an arm 48 fixed to the shaft 49 which is mounted inside and concentrically of the hollow shaft 43. The selectable element 37 also has a shoulder designated by the reference character 52 operatively engaging one end of a bell crank lever 53, which is also pivotally mounted upon the shaft 40. At its other end, the bell crank lever 53 carries a pin 54 which engages the previously mentioned link 27 by being disposed within a slot 55 therein. The link 27, besides having pin and slot engagement with the bell crank lever 53, is bifurcated and has the bifurcations oppositely bent to form transversely extending portions 56 and 57 at the slotted end thereof which operatively engage the bell crank levers 46 and 39 respectively. With this arrangement, counterclockwise rotation of any one of the bell crank levers 39, 46, and 53 will cause the link 27 to be reciprocated leftwardly, and through the connection of the latter with the lever 25, the record reader clutch throw-out lever 18 will be rotated into engagement with the clutch throw-out lug 20 to cause the clutch to be disengaged and the shaft 12 to become stationary, so that all signal sensing and function selecting operations of the automatic control apparatus are terminated.

The link 27 carries a lug 58 which moves into retained engagement with a shoulder 64 of one arm of a bell crank lever 59 carried by and fixed to a shaft 60. Bell crank lever 59 is normally urged in a clockwise direction by the tension spring 62 and has its upstanding arm 63 in operative engagement with one arm of a bell crank lever 65 mounted on a pivot pin 66. The other arm of the bell crank lever 65 operatively engages an arm 67 carried by a hollow shaft 68 which surrounds and is concentric with the previously mentioned hollow shaft 43. Upon leftward reciprocation of the link 27, as previously described, the lug 58 is retained by the bell crank lever 59 which serves as a latch to maintain the record reader clutch disengaged. The record reader shaft 12 may be restored to operation by counterclockwise rotation of the latching bell crank 59, which permits the lug 58 to escape from engagement with the shoulder 64. The counterclockwise rotation of the latching bell crank 59 may be accomplished by clockwise rotation of the bell crank lever 65 or by counterclockwise rotation of an arm 70 fixed to the shaft 60. The manner in which the bell crank lever 65 may be rotated in a clockwise direction will be described hereinafter. The arm 70 is rotated counterclockwise by a cam 71 fixed to the assembler elevator operating shaft 30. It is clearly described in the previously mentioned patent that upon the selection of an assembler elevator operation, the operation of the record reader shaft 12 is interrupted by disengagement of its clutch members 13 and 14 and the assembler elevator shaft is set in operation by engagement of its clutch members 31 and 32. In order that the record reader operating shaft may be restarted at the conclusion of the assembler elevator operation, the cam 71 has its apex rotated into engagement with the arm 70 to rotate it in a counterclockwise direction and thus to rotate the shaft 60 and the latching bell crank 59 to release the lug 58 carried by the link 27 from engagement with the shoulder 64.

It will be understood that the selectable elements 35, 36, and 37 are conditioned in accordance with certain settings of the code bars 34 to rock their associated bell crank levers 39, 46, and 53 respectively in a counterclockwise direction. The slight rotation of bell crank levers 39 and 46 is transmitted to the arms 42 and 48 respectively and results in a slight clockwise rotation of the shafts 43 and 49 respectively. At the same time the link 27 is reciprocated leftwardly as previously described, to interrupte the operation of the record reader shaft 12 and is latched in that position.

Referring now to Fig. 2, it will be seen that the shaft 49 and the hollow shafts 43 and 68 appear in the lower right-hand corner thereof. The shafts 49, 43, and 68 carry at their upper ends the arms 75, 76, and 77 respectively.

As shown in Fig. 2, there is provided as a part of the automatic control unit, a shaft 80 which may be power driven from any suitable source of power such as a continuously rotating element of the principal machine. The shaft 80 carries fixed thereto a driving portion 81 of a clutch toward which there is continuously urged by a compression spring 82, a driven portion 83 which is normally restrained from engagement with the driving portion 81 by a clutch throw-out lever 84 pivotally mounted upon the pivot pin 85. The driven portion 83 of the clutch carries a cam 86 against which rides a cam follower 87 secured to one arm of a bell crank lever 88, the other arm of which operatively engages the arm 77 carried by the hollow shaft 68. The bell crank lever 88 is fixed to a rock shaft 89. The shaft 80 also carries fixed thereto a driving portion 95 of a clutch, the driven portion 96 of which is normally urged into engagement therewith by means of a compression spring 97 and which is normally restrained from engagement therewith by clutch throw-out lever 98 mounted upon pivot pin 99. The driven portion 96 of the clutch has secured thereto a cam 101 against which rides a cam follower 102 carried by an arm 103 fixed to the previously mentioned rock shaft 89. Clutch throw-out lever 84 is controlled by arm 106 of a three-armed lever designated generally by the reference character 105, which carries the arms 106, 108, and 110. The arms 108 and 110 extend in spaced relation and substantially parallel so that their outer ends are disposed adjacent to the arms 75 and 76 carried by the shafts 49 and 43 respectively, but the spacing is such that only one of the arms 108 or 110 may operatively engage an arm 76 or 75 respectively at a given time. Interposed between the arms 108 and 110 of lever 105 there is a lever indicated generally by the reference numeral 104, which consists of the two arms 107 and 109. The arm 107 operatively engages the clutch throw-out lever 98 and the arm 109 terminates substantially in alignment with the ends of the arms 108 and 110 of lever 105 and intermediate those arms.

Levers 104 and 105 are pivotally mounted on a pivot pin 112 which is mounted on the extended arm 113 of a U-shaped lever 114 which is pivotally mounted on a shaft 115. Means to be described hereinafter is provided for rocking the U-shaped lever 114 on the pivot shaft 115 a sufficient distance to cause the end of arm 109 of lever 104 to move from operative alignment with arm 75 to operative alignment with arm 76 or vice versa. In Fig. 2, the arm 109 is shown in alignment with arm 75 and arm 108 is aligned with arm 76. The distance through which U-shaped lever 114 can rock will permit arm 109 to be transferred to alignment with arm 76, which transfer will be accompanied by movement of lever arm 110 into alignment with arm 75 and by movement of lever arm 108 out of alignment with arm 76. With this arrangement, operation of the levers 104 and 105 by the arms 75 and 76 may be reversed.

The cam 101, in addition to having the cooperating cam follower 102 carried by the arm 103, also has cooperating therewith a cam follower 118 carried by a lever arm 119 which is fixed to a rock shaft 120.

The portion of Fig. 2 which has been described up to this point is employed for controlling the magazine shifting mechanism of a principal machine shown in the upper portion of Fig. 2. In that figure, the reference numeral 126 designates a pair of matrix storage magazines of a standard commercial line casting and composing machine. The magazines may be supported at the rear edges thereof by pivots (not shown) and the upper magazine may be supported above the lower magazine in the usual way so that the two magazines may be shifted as a unit. A bracket 127 having a downwardly extending arm 128 is provided for supporting the magazines adjacent the front edges thereof and at the lower end of the arm 128 is secured a transversely extending pivot pin 129. A toggle lever system consisting of the levers 131 and 132, connects the bracket 127 to a portion 133 of the stationary frame of the line-casting machine, there being a pivot pin 134 secured to the frame portion 133 for pivotally supporting the lower end of the lever 132. The upper end of the lever 131 pivotally engages the pivot pin 129, and the adjacent ends of the levers 131 and 132 are pivotally connected together by a common pivot 136.

A bell crank lever 137 which is pivotally mounted on a fixed pivot 138 has one end operatively engaging the pivot pin 136 to operate the toggle lever system and has its other end connected by a link 139 to a crank pin 141 carried by a rotatable cam member 142. The rotatable member 142 is fixed to a rotatable shaft 143 which is driven through the medium of beveled gears 144 and 146, shaft 147 and friction clutch 148, from a worm gear 149 to which rotation may be imparted by a worm 151. The worm 151 is loosely mounted on a shaft 152 which may be any power driven shaft of the principal machine such as the so-called intermediate shaft. The loose mounting of worm 151 permits the shaft 152 to rotate independently of the worm and the shaft has secured thereto in spaced relation to the worm 151 a bevel gear 153.

A clutch sleeve 154 is loosely and slidably mounted on the shaft 152 intermediate the worm 151 and the gear 153 and the sleeve 154 has positive driving connection with the worm 151 through the medium of leftwardly extending fingers 156 which are disposed within slots 157 in the hub of worm 151. At its opposite end, the sleeve 154 is provided with teeth 158 which may be brought into engagement with recesses 159 formed in the hub of bevel gear 153 to permit the establishment of driving connection between the beveled gear 153 and the worm 151 when the clutch sleeve 154 is shifted rightwardly. The sides of the teeth 158 are preferably disposed obliquely with respect to the faces thereof, and the recesses 159 are correspondingly formed as shown in the drawings, so that when the clutch sleeve is brought into engagement with the hub of the rotating beveled gear 153, a mutual camming action between the teeth 158 and recesses 159 creates a continuing tendency for the clutch sleeve to be forced out of engagement. Thus the clutch always seeks disengagement unless restrained therefrom, and in order to insure engagement of the clutch during the interval required for the completion of a magazine shift, the rotatable cam member 142 which operates the link 139 is provided on its opposite face with diametrically opposed recesses 161. A lever 162 pivotally mounted at 163 has one end thereof engaging a clutch collar 164 and the other end terminating in a portion which may enter a recess 161 in the cam member 142.

The clutch collar 164 which is carried by the clutch sleeve 154 is connected by a shifter fork 165 to a lever 166 mounted on a rock shaft 167. A pin 168 forms the connection between the fork 165 and lever 166. At the opposite end of the rock shaft 167 there is secured a lever 169 which has pivotally depending from the outer end thereof a link 171. At its lower end, the link 171 pivotally engages a keylever 172 which is provided with a finger key top 173.

The operation of the disclosed part of the principal machine is as follows: When the magazines are to be shifted by manual control of the power actuating mechanism, the finger key 173 is depressed, which causes the keylever 172 to be actuated and the link 171 to be reciprocated upwardly. The link 171 rotates the lever 169 in a clockwise direction and thus rocks the shaft 167 to cause the teeth 158 on the clutch sleeve 154 to engage the hub of the continuously rotated beveled gear 153, and thus to drive the worm 151. The rotation of the latter causes the worm gear 149 to be driven and through the medium of elements previously described, the cam member 142 is rotated and the link 139 is thereby caused to rotate the bell crank lever 137. The bell crank lever may be rotated counterclockwise from the position shown in the drawings and this causes the pivot pin 136 to describe an arc in a counterclockwise direction, so that the member 131 of the toggle lever system is drawn downwardly and the magazines, which are shown in their upper positions, are lowered.

Since the lever 162 is connected to the clutch collar 164, the shifting of the clutch collar to cause engagement of the clutch results in a counterclockwise rotation of the lever 162 about the pivot 163. This rotation of the lever 162 causes its free end to be withdrawn from a recess 161 in the face of the rotatable cam member 142. As the member 142 rotates, the lever 162 is blocked from clockwise rotation by the engagement of the free end of the lever with the face of the cam member 142. The clutch sleeve 154 is thus maintained in engagement with the hub of the beveled gear 153. When the cam 142 has completed one-half revolution which occurs at the completion of a magazine shift, a recess 161 is brought into alignment with the free end of the lever 162, so that the recess may be entered by the end of the lever, thus permitting the clutch to become disengaged by a leftward movement of the clutch sleeve 154 under the influence of the mutual camming action of the teeth 158 and recesses 159.

The magazines 126 may be restored to the position shown in Fig. 2 which is the upper position by again depressing the key-lever 172 by means of the key top 173. The same sequence of operations previously described will take place to cause the worm 151 to drive the gear 152 which, in turn, causes the cam member 142 to be rotated in the same direction as before. The crank pin 141 which was carried to its lowermost position in the accomplishment of the previously described shift operation is now carried to its uppermost position and thus the bell crank 137 is rocked in clockwise direction and the toggle lever system 131—132 is straightened to cause the magazines to be elevated to their uppermost positions.

Two connections between the principal machine shown in the upper half of Fig. 2 and the control mechanism shown in the lower half are provided in order that the control mechanism may supervise the operation of the magazine shifting mechanism. One of these connections is a lever arm 176 which is fixed to the rock shaft 120 and which has its outer end disposed below and in operative alignment with the lever 169 carried by the clutch shifting rock shaft 167. The other connection is link bar 177 which has one end pivoted to a bracket 178 carried by one of the magazines 126 and the other end pivotally connected at 179 to the U-shaped lever 114.

The function of the lever arm 176 is to rotate the lever 169 clockwise when the rock shaft 120 is rotated due to passage of the cam follower 118 over the apex of cam 101. The clockwise rotation of the lever arm 169 by the lever arm 176 is the same as the rotation produced by operation of the keylever 172 and results in rotation of the cam member 142 and shifting of the magazines. The link bar 177 transmits motion from the magazines 126 to the U-shaped lever 114 so that when the magazines are lowered, the U-shaped lever 114 is rocked in a clockwise direction and when the magazines are raised, it is rocked in a counterclockwise direction. The clockwise rocking of the U-shaped lever 114 causes the pivot pin 112 carried by the arm 113 to be lowered and slightly tilted rightwardly, whereby lever arm 108 is moved out of alignment with lever arm 76, lever 110 is moved into alignment with lever arm 75, and lever arm 109 is transferred from alignment with lever arm 75 to alignment with lever arm 76. Upward movement of the magazines causes the lever arms 108, 109, and 110 to be restored to the positions shown in Fig. 2.

In describing the operation of the magazine shifting mechanism of the principal machine shown in the upper half of Fig. 2, under the control of the apparatus shown in Fig. 1 and in the lower half of Fig. 2, it will be assumed that the magazines are to be moved from the upper position as shown in Fig. 2 to the lower position and that the code bars 34 will have been positioned in the proper arrangement to select the proper selectable bar to shift the magazines to the lower position. The selectable bar 36 is the one which will cause the magazines to be shifted from the upper to the lower position and when the bar 36 has been selected, it is moved forward by means and in a manner clearly described in Patent No. 2,091,286, and in moving forward will rotate the bell crank lever 46 counterclockwise. As the bell crank 46 is rotated, it will engage the depending portion 56 of link 27 which is disposed in its path and will cause the link 27 to be moved leftwardly and it will also rotate the lever arm 48 and its shaft 49 clockwise. As the link 27 is moved leftwardly, it will cause the lever 25 to rotate the clutch throw-out lever 18 into the path of the clutch throw-out dog 21 so that the shaft 12 which, as previously described, is the shaft which controls the stored signal sensing apparatus, will be stopped and the sensing of signals will be interrupted. The bell crank lever 46 moves the link 27 a sufficient distance leftwardly so that the shoulder 64 on bell crank lever 59 will engage the latch member 58 and restrain link 27 from returning to its rightward position.

The previously mentioned clockwise rotation of shaft 49 causes lever arm 75 to be rotated clockwise which, in turn, causes lever 104 to be rotated counterclockwise. Bell crank lever 98, which serves as a clutch throw-out lever for the clutch 96 has one arm thereof disposed in the path of movement of arm 107 of lever 104 and bell crank lever 98 is thus rocked about its supporting shaft 99 and is withdrawn from engagement with the driven portion 96 of the clutch which operates the cam 101 and that portion is permitted to engage the driving portion 95 so that the cam 101 is rotated in the direction indicated by the arrow. As the cam 101 rotates, the apex thereof lifts the cam follower 118, whereby the rock shaft 120 is rotated and the lever arm 176 is rotated therewith to rock the lever arm 169 carried by the shaft 167 in a clockwise direction to cause engagement of the clutch members 158 and 159 of the principal machine, which results in rotation of the cam member 142 and shifting of the magazines in the manner previously described.

After the rock shaft 120 has been rocked by the action of the apex of cam 101, the cam continues to rotate and the apex thereof advances toward and cams out the cam follower 102 carried by the lever arm 103. The rock shaft 89 is thus rocked and the bell crank lever 88 carried thereby is caused to engage the lever arm 77 which is disposed in its path of rotation, whereby the lever arm 77 is rotated counterclockwise and with it the hollow shaft 68 by which it is carried.

The clockwise rotation of the hollow shaft 68 from the bell crank lever 88, rock shaft 89, lever arm 103, and cam follower 102, results in counterclockwise rotation of the lever arm 67 shown in Fig. 1. The bell crank lever 65 is rotated clockwise by the lever arm 67 and the bell crank lever 59 is rotated to free the latch member 58 from the shoulder 64, whereby the link 27 is permitted to return to its rightward position and the clutch throw-out lever 18 is withdrawn from engagement with the clutch throw-out dog 21 through the action of tension spring 22, whereby the record reader shaft 12 resumes rotation.

Attention is directed to the fact that in the normal or idle position of the mechanism shown in Fig. 2, the apex of cam 101 is spaced angularly from its follower roller 118 so that a period of time, dependent on the amount of the angular spacing and the speed of rotation of the shaft 80, intervenes between the starting of the cam 101 and the rocking of the shaft 120 by the cam follower lever 119. Thus there is afforded a delay in the initiation of the magazine shift, after the selection of that operation, in which any previously selected operation may be consummated. The angular distance through which apex of cam 101 passes after it has actuated follower lever 119 and before it actuates the cam follower lever 103 to restart the record reader shaft 12 provides an interval, the duration of which is dependent upon the relative positions of cam follower rolls 102 and 118 and upon the speed of rotation of the shaft 80, during which the sensing of matrix release signal combinations is postponed to permit the magazine shift mechanism, which may require an appreciable period of time in which to operate, to complete the positioning of the magazines, so that a matrix release condition may not be set up in the release reeds while the magazines are unable to respond to such condition.

Meanwhile, the lowering of the magazines causes the downward movement of the link 177 which, though its engagement at 179 with the lever 114, causes the latter to be rocked clockwise and the pivot pin 112 tilted and lowered sufficiently to bring the lever arm 110 into alignment with the lever arm 75 and to bring the lever arm 109 into alignment with the lever arm 76. The clutch in the principal machine through which power is transmitted for shifting the magazines becomes disengaged automatically at the conclusion of the shift in the manner previously described.

If the next magazine shift selecting signal presented to the record reader mechanism should be identical with the one which caused the selection of the selectable bar 36, that bar would be selected again and the bell crank lever 46, the lever arm 48, the shaft 49, and lever arm 75 would be rotated just as previously described. Also, the link 27 would be shifted leftwardly to cause the record reader shaft 12 to be stopped. However, since the lever 104 which controls clutch throwout bell crank lever 98 would no longer be in alignment with lever arm 75 but instead lever arm 89 of three-armed lever 105 would be in alignment with that lever arm, the three-armed lever 105 would be rotated counterclockwise and the arm 106 would withdraw clutch throw-out lever 84 from engagement with clutch member 83 to permit engagement between clutch members 81 and 83, whereby cam 86 would be rotated in the direction indicated by the arrow. Thus the clutch which controls the cam which in turn sets in operation the magazine shifting mechanism of the principal machine would not be actuated and no magazine shift operation would occur. As soon as the cam 86 would begin to rotate, its apex, which in the idle position is immediately adjacent to the cam follower 87, would engage the cam follower and rock the bell crank lever 88, whereby the lever arm 77 and shaft 68 would be rotated counterclockwise. This would result in reestablishment of driving connection between the clutch members 13 and 14 of Fig. 1 in a manner set forth in connection with the preceding description of the rocking of bell crank lever 88 and would cause the record reader shaft 12 to begin to rotate.

It will be noted by reference to Fig. 2, that the cam 101 must rotate through more than one-half revolution before the rock shaft 89 and bell crank 88 are rocked to cause the release of the link 27 of Fig. 1 from the shoulder 64 of bell crank lever 59, whereas this release is accomplished as soon as the cam 86 begins to rotate by reason of the fact that, in the idle condition, the apex of the cam is positoned as close as possible to the cam follower 87. Thus the delay in the operation of the record reader shaft, which is provided in order that time may be allowed for the completion of a magazine shift operation, is neither required nor desired when the clutch member 83 is tripped due to a repetition of a magazine shift signal, and accordingly the record reader shaft 12 is set in operation almost as soon as it is stopped.

The repetition of a magazine shift signal would be an idle signal as outlined in the foregoing paragraphs, and such repeated signal would not normally appear in the control record. The next magazine shift signal which would normally be inserted in the control record would be a signal to reshift the magazines to their upper position.

Assuming that such signal is received, the code bars 34 will be set to cause the selection of the selectable bar 35. As this bar is operated upon selection the bell crank lever 39 which it engages, rotates counterclockwise, draws the link 27 leftwardly through cooperation with the upstanding portion 57, and rotates lever arm 42 and hollow shaft 43 clockwise. It is, of course, understood that the link 27 is drawn leftwardly a sufficient distance to cause it to be latched by the bell crank lever 59 as described before. Since the magazines are now assumed to be in their lowermost positions and the lever 104 is assumed to be shifted into alignment with the lever arm 76 carried by the hollow shaft 43, this lever arm will be rotated in a clockwise direction and the lever 104 will be rotated in a counterclockwise direction to rock the bell crank clutch throw-out lever 98 and set in motion the cam 101, as previously described. The rotation of the cam 101 is effective through the cam follower 118, lever 119, rock shaft 120, lever arm 176, and lever arm 169 to set in operation the magazine shifting mechanism of the principal machine, whereby the cam member 142 will be rotated to bring the crank pin 141 into its upper position and the magazines will be shifted into their upper position.

Continued rotation of the cam 101 to the completion of its cycle results in rotation of the lever arm 103, rock shaft 89, and bell crank lever 88, whereby the system of shafts and levers which can effect the release of the link 27 from the latching bell crank 59 will be actuated in a manner already described to permit the record reader shaft 12 to resume operation.

As described in the Patent No. 2,091,286, it is desirable that the record reader be interrupted when that operation of the principal machine which involves the lifting of the assembler elevator for transfer of an assembled line of matrices to the line delivery slide is selected, and such interruption is accomplished by interrupting the revolving shaft 12. In Fig. 1 there is shown a selectable bar 37 which is intended to represent the function lever which is selected by the code bars 34 when they are set in accordance with the reception of an elevator signal, and the selectable bar 37 is operated to rotate the bell crank lever 53 counterclockwise and through engagement of the pin 54 carried by the bell crank 53 with slot 55 in link 27, the link is moved leftwardly until it latches behind the shoulder 64, whereby the record reader shaft 12 is interrupted. Mechanism is also set in operation as a result of the selection of selectable bar 37 for permitting the clutch members 31 and 32 of the elevator operating shaft 30 to be engaged so that that shaft is rotated. The mechanism for permitting the engagement of the clutch members 31 and 32 is clearly set forth in the patent above identified. As the shaft 30 rotates, the cam 71 rotates with it, and in so doing, it cams out the lever arm 70 at a predetermined point in its cycle of rotation, which results in rocking of the rock shaft 60 and operation of the latching bell crank 59 just as if it had been actuated from the bell crank lever 65. It is thus apparent that the bell crank lever 59 may be actuated to release the link 27 and permit renewed operation of the record reader shaft, regardless of whether the record reader shaft is interrupted for a magazine shift operation or for an elevator operation.

In Fig. 3 at the lower portion thereof, there is shown control mechanism adapted for use in connection with the operation of a principal machine of the type disclosed in the upper portion of Fig. 3, in which the matrix storage magazines are stationarily mounted and in which the escapement actuating rods individual to each magazine are selectively actuated by a set of release reeds which is shiftable into operative alignment with one or another of the sets of escapement actuating rods. It will be observed that the previously described concentric shafts 49, 43, and 68 are shown in the lower right-hand portion of Fig. 3, whereby it is indicated that the mechanism shown in Fig. 3 may be controlled by and from the mechanism shown in Fig. 1 in the same manner as the mechanism shown in Fig. 2 may be controlled from that shown in Fig. 1.

The shafts 49, 43, and 68 are provided at their upper ends with the lever arms 185, 186, and 187 respectively. The outer ends of the lever arms 185 and 186 are disposed in alignment with clutch throw-out levers 190 and 191 respectively, which are pivoted on rod 192. A power driven shaft 194 which may correspond to the power driven shaft 80 of Fig. 2, carries positive drive clutches which may consist of driving portion 196, driven portion 197, driving portion 198, and driven portion 199. The driven portion 197 is normally restrained from engagement with the driving portion 196 by clutch throw-out lever 190 and it carries cams 201 and 202. A compression spring 203 urges the driven portion 197 into engagement with the driving portion 196 when the clutch throw-out lever 190 is rocked on rod 192 out of engagement with driven portion 197. The driven portion of the clutch combination 198—199 is normally restrained from engagement with the driving portion 198 by clutch throw-out lever 191 and it carries cams 203 and 204. A compression spring 205 urges the driven portion 199 into engagement with the driving portion 198 when the clutch throw-out lever 191 is withdrawn from engagement with the driven portion 199. A rock shaft 206 carries lever arms 207 and 208, the outer ends of which are provided with cam followers 211 and 212 respectively, which engage cams 201 and 203 respectively. The rock shaft 206 also has secured thereto a lever arm 213, the outer end of which is connected by a link bar 214 to one arm of a bell crank lever 216, the other arm of which is disposed in operative alignment with the lever arm 187 carried by the hollow shaft 68. The bell crank lever 216 is rotatable about the pivot rod 217.

A U-shaped lever 218 carries on one arm thereof a cam follower 219 which is disposed in engagement with the cam 202. A similar U-shaped lever 221 has on one arm thereof cam follower 222 continuously engaging the cam 204. The U-shaped levers 218 and 221 are mounted to rock on the rock shafts 223 and 224 respectively and are biased by springs 226 and 227 in appropriate angular directions to maintain the cam followers 219 and 222 in engagement with the cams 202 and 204 respectively. The U-shaped lever 221 has pivoted thereto a lever 228 which may be described as substantially Z-shaped. The base portion 229 of the lever 228 is blocked by a portion of the U-shaped levers 221, whereby rotation of the lever 228 under the influence of tension spring 231 is limited. The U-shaped lever 218 pivotally supports a similar Z-shaped lever 232 which is biased for rotation toward the lever 228 by a tension spring 233 and its rotation with respect to the U-shaped lever 218 is limited by its base portion (not shown) similarly to the limiting of the angular rotation of lever 228 by its base portion 229. Z-shaped levers 228 and 232 have their upper arms 236 and 237 respectively, disposed in opposed alignment and the outer ends thereof are spaced from each other.

The principal machine for the control of which the mechanism described in the foregoing paragraphs is particularly adapted is provided with upper and lower matrix storage magazines 240 and 241, respectively, which have escapements 242 and 243 respectively controlled by escapement operating rods 244 and 246 respectively. A set of release reeds 247 is supported in a cradle 248 which may rock about the knife edge 249 formed on the leg 251 through a sufficient angular distance to effect operative alignment of the release reeds 247 with the escapement actuating rods 244 or 246. The cradle 248 has an arm 252 which is connected by a link 253 to an operating lever 254 pivotally mounted on a portion 256 of the frame of the principal machine. The operating lever 254 has hand grip portion 257 and spring urged detent pin 258 which may cooperate with one or another of a plurality of restraining notches 259 formed in a portion 261 of the frame of the principal machine. The operating lever 254 has a laterally extending arm 262 disposed in the space between the opposed ends of the arms 236 and 237 of Z-shaped levers 228 and 232 respectively, pivotally supported as previously described by the U-shaped levers 221 and 218, respectively.

The cradle 248 which carries the release reeds 247 may be rocked by manually shifting the hand grip portion 257 of the lever 254 away from and toward the operator. The shifting of the hand grip away from the operator causes the link 253 to rock the cradle 248 rearwardly to bring the release reeds 247 into operative alignment with the escapement actuating rods 246 of the lower magazine. Movement of the hand grip 257 toward the operator causes the release reeds to be restored to the position shown in Fig. 3, wherein they are in alignment with the escapement actuating rods 244 of the upper magazine 240. The detent pin 258 drops into one or another of the restraining notches 259 as the cradle 248 is rocked from one position to another.

The shifting of the operating lever 254 may be effected mechanically and automatically by means of the automatic control mechanism shown in Fig. 1 with the cooperation of the power driven shaft 194 and associated elements shown in the lower portion of Fig. 3. In the description of the operation of the automatic control system for shifting the cradle 248, it will be assumed that the release reeds are to be shifted into alignment with the escapement actuating rods 246. The selectable element which is assigned to the control of the operative association of release reeds 247 with rods 246 is the element 35 shown in Fig. 1, and when that element is selected, a series of operations which have been fully described in foregoing portions of this specification are effective to cause the record reader shaft 12 to be stopped and the shaft 43 to be rotated in a clockwise direction. The lever arm 186 is also rotated in a clockwise direction, whereby the clutch throw-out lever 191 is withdrawn from engagement with the driven portion 199 which engages the driving portion 198 to effect rotation of the cam 204 in the direction indicated by the arrow. As the cam 204 rotates, its apex rocks the U-shaped lever 221 by means of its cam follower 222 to cause the arm 236 to engage the laterally extending arm 262 of operating lever 254 and move it rearwardly. The link 253 is thus shifted rearwardly and the cradle 248 is rocked to bring the release reeds 247 into alignment with the escapement actuating rods 246.

As the driven clutch portion 199 continues to rotate and before it completes the one revolution it is capable of making, the apex of cam 203 cams outwardly cam follower 212, and through lever arm 208 rocks shaft 206 which, through lever arm 213 and link 214, causes bell crank lever 216 to be rocked. The direction of rotation of the bell crank lever 216 is such that it rotates the lever arm 187 carried by the hollow shaft 68 counterclockwise, which results, as previously described, in restarting the record reader shaft 12.

The release reeds may be restored to the position shown in Fig. 3 by the selection of selectable element 36. The result of the operation of selectable element 36 is clockwise rotation of shaft 49 and lever arm 185 to cause the clutch thow-out lever 190 to be withdrawn and permit driven clutch portion 197 to engage driving portion 196. Cam 202 rotates with the driven clutch portion 197 and through cam follower 219 U-shaped lever 218 and upper arm 237 of Z-shaped lever 232 shifts the operating lever 254 forwardly to restore the release reeds 247 into operative alignment with the escapement actuating rods 244. Before the clutch completes its cycle of rotation, the apex of cam 201 causes the rocking of shaft 266, in a manner similar to the apex of cam 203, to cause counterclockwise rotation of the hollow shaft 68 and restarting of the record reader shaft 12.

The reed shifting mechanism shown in Fig. 3 contemplates a delay in the operation of the shifting lever 254 and an allowance of time for the completion of the shift during which the record reader mechanism is idle, similarly to the provision of operating margins, in the mechanism shown in Fig. 2. Thus the cams 202 and 204 rotate through appreciable angles before they actuate their followers to effect shifting of the cradle 248, thus affording time for the completion of a previous operation such as, for example, the settling of a previously operated release reed 247. Likewise, the cams 201 and 203 actuate their follower levers 207 and 208 respectively after the operation of cam follower levers 221 and 218 respectively, so that the record reader shaft 12 is not restarted to introduce matrix release conditions until the shifting of cradle 248 has been carried to a point that the release reeds are positioned to release matrices by the time a matrix release signal has been rendered effective.

It is to be noted that the arrangement shown in Fig. 3 has no equivalent of the U-shaped lever 114 of Fig. 2, for the reason that it is not necessary to shift operating levers to render repeated magazine shift signals ineffective. Such repeated signals are inherently ineffective in the arrangement shown in Fig. 3, for the reason that the operating lever 254 is oppositely shiftable to effect rocking of the cradle 248 backward and forward, whereas in the arrangement shown in Fig. 2, the lever arm 169 is always shifted in the same direction to effect raising or lowering of the magazines. If a repeated shift signal causes a repeated rotation of the cam 202 or 204, the U-shaped lever associated therewith will merely rock idly upon its supporting shaft due to the fact that it has already acted upon the laterally extending arm 262 of operating lever 254 and it therefore cannot operate upon that element in advance of a restorative operation of the operating lever 254 in response to a different magazine shift signal.

It is also to be noted that no mechanism corresponding to the cam 86 of Fig. 2 is provided in the arrangement shown in Fig. 3 to restart the record reader shaft 12 immediately upon its being stopped as the result of reception of a repeated magazine shift signal. The reason for this is that the shaft 194 may be operated at a much higher speed than the shaft 80 due to the fact that the mass of cradle 248 and release reeds 247 to be moved is much less than that of magazines 126 of Fig. 2, and the shift of the reeds can therefore be accomplished in a much shorter time. The cams 201 and 203 are permitted to complete a full cycle of rotation when a non-effective repeated magazine signal is received just as they do when an effective magazine shift signal is received, and the interval during which the record reader shaft 12 is delayed is so brief as to constitute no appreciable loss of operating time.

The pivotal engagement of the levers 228 and 232 with the U-shaped levers 221 and 218 respectively is provided as a safeguard against injury to any of the parts in the event that cradle 248 resists normal rocking. If either of the arms 236 or 237 is seriously resisted by the laterally extending arm 262 of operating lever 254, relative movement between the lever 228 or 232 and its supporting lever 221 or 218 may occur and thus the motion imparted by the associated operating cam may be taken up by the relief spring 231 or 233 to prevent forcing of the shifting lever 254.

In Fig. 4 there is shown an adaptation of the control mechanism shown in the lower portion of Fig. 3 to another form of principle machine which, like the one represented in Fig. 3, has release reeds supported in a shiftable cradle. The cradle, a fragment of which is designated by the reference character 266 of Fig. 4 is provided with a hand grip 267 for manual operation. For automatic operation, the operating lever 268 is pivoted to any stationary portion of the principal machine by means of the pivot pin 269 and is provided with a slot 271 in which is disposed a pin 272 carried by the cradle 266. The operating lever 268 is provided with a transversely extending arm 273 which corresponds to the arm 262 of operating lever 254 and which is disposed between the ends of the arms 236 and 237 of levers 228 and 232 respectively pivotally supported by U-shaped levers 221 and 218 respectively. A jockey roller 276 carried by a spring biased bell crank lever 277 serves as a detent in cooperation with the pointed end 278 of operating lever 268 and prevents accidental displacement of the cradle 266 from effective operating position.

Although a particular embodiment of the invention has been shown in the drawings and described in the specification, it is to be understood that the invention is not limited to the specific structure disclosed, but that it is capable of modification, rearrangement, or substitution of elements and operations without departing from the spirit of the invention and within the scope of the appended claims.

What is claimed is:

1. In an automatic control device, signal presenting means, selector means responsive to presented signals, means controlled by the selector means for interrupting the signal presenting means, means also controlled by said selector means for initiating operations, and means controlled by said operation initiating means for restarting said signal presenting means after various intervals depending upon the nature of presented signals.

2. In an automatic control device, a first set of levers, a second set of levers shiftable with respect to said first set and disposed for operation therefrom, a power driven shaft, operation performing members carried by said shaft, means for connecting said members to said shaft individually, means for controlling said connecting means from said second set of levers, and means for shifting said second set of levers with respect to said first set for reversing the control of the first set of levers over said connecting means.

3. In a signal controlled apparatus, signal presenting means, selectable elements, signal controllable means for conditioning said selectable elements, means actuated by said selectable elements for interrupting the signal introducing means, means simultaneously actuated by said selectable elements for controlling operation initiating means, and means controlled by said operation initiating means for restarting said signal presenting means.

4. In a signal controlled apparatus, signal presenting means, selectable elements, signal controllable means for conditioning said selectable elements, means actuated by said elements for interrupting the signal presenting means, means simultaneously actuated by said selectable elements for controlling operation initiating means, means controlled by the operation initiating means in timed relation thereto for restarting the signal presenting means, and means for altering the operative association between selectable elements and said operation initiating means.

5. In a linecasting and composing machine having a plurality of matrix storage magazines to be rendered effective selectively, means under control of signals presented successively for initiating magazine selection functions of said machine including selectable elements, levers individually actuated by said elements, power driven cams conditioned for operation by said levers, and means actuated from said power driven cams for establishing signal presentation.

6. In a linecasting and composing machine, devices to be shifted to selected positions, a lever for initiating a shifting operation, and automatic means for operating said lever comprising a continuously driven shaft, a cam loosely mounted on said shaft, a clutch for establishing driving connection between said shaft and said cam, means for controlling said clutch, plural means for actuating the clutch controlling means selectively, and means for varying the operative relation between said clutch controlling means and said plural actuating means.

7. In a linecasting and composing machine, devices to be shifted to selected positions, a lever for initiating a shifting operation, and automatic means for operating said lever comprising a continuously driven shaft, a cam loosely mounted on said shaft, a clutch for establishing driving connection between said shaft and said cam, means for controlling the engagement of said clutch, plural means for actuating the clutch controlling means selectively, and means operable upon the shifting of said shiftable devices for transferring the control of said clutch controlling means from one to another of said plural means.

8. In a linecasting and composing machine having a plurality of matrix storage magazines to be rendered effective selectively, a shaft for controlling signal presenting means, a set of code bars to be variably positioned in accordance with presented signals, a plurality of selectable elements controlled by said code bars, lever systems associated with said selectable elements, a cam controlled from said lever systems, means also controlled by said lever systems for disabling the shaft, means controlled by the cam for achieving magazine selection, and means also controlled by the cam for re-activating said shaft.

9. In a linecasting and composing machine having a plurality of matrix storage magazines to be rendered effective selectively and means for selecting the magazines, signal presenting means, signal controllable means for rendering active the magazine selecting means, means for delaying the response of the magazine selecting means, and means for disabling the signal presenting means during the operation of the magazine selecting means.

10. In a linecasting and composing machine having a plurality of matrix storage magazines to be rendered effective selectively and means for selecting the magazines, signal presenting means, signal controllable means for rendering active the magazine selecting means, means for delaying the response of the magazine selecting means, and means for disabling the signal presenting means during the delay in the response of the magazine selecting means and during the operation thereof.

11. In a linecasting and composing machine having a plurality of matrix storage magazines to be rendered effective selectively and means for selecting the magazines, signal presenting means, signal controllable means for rendering active the magazine selecting means, means for delaying the response of the magazine selecting means for a predetermined interval, means for disabling the signal presenting means prior to the response of the magazine selecting means, and means for restarting the signal presenting means after the completion of the magazine selection operation.

12. In a linecasting and composing machine having a plurality of matrix storage magazines to be shifted into effective position selectively, signal presenting means, selectable elements, signal controllable means for conditioning said selectable elements, means for interrupting said signal presenting means, magazine shifting mechanism, means set in operation by said selectable elements for activating said magazine shifting mechanism after a predetermined interval of operation, and means included in said last mentioned means for restarting said signal presenting means during the shifting of said magazines.

13. In a linecasting and composing machine having a plurality of matrix storage magazines and a set of matrix release elements, means for effecting relative movement between said magazines and said set of release elements, signal presenting means, selectable elements, signal controllable means for conditioning said selectable elements, means controlled by said selectable elements for interrupting said signal presenting means, means set in operation by said selectable elements for activating said movement effecting means after a predetermined interval of operation, and means included in said activating means for restarting said signal presenting means during said relative movement.

14. In a linecasting and composing machine having a plurality of matrix storage magazines and a set of matrix release elements shiftable into operative association with said magazines selectively, signal presenting means, selectable elements, signal controllable means for conditioning said selectable elements, means controlled by said selectable elements for interrupting said signal presenting means, means for shifting said set of matrix release elements, means set in operation by said selectable elements for actuating said shifting means after a predetermined interval of operation, and means included in said activating means for restarting said signal presenting means after the shifting of said set of release elements.

15. In a linecasting and composing machine having a plurality of matrix storage magazines to be rendered effective selectively, signal presenting means, signal controllable code bars, pull bars selectable under the control of said code bars, means actuated by said pull bars for disabling said signal presenting means, a rotatable shaft, power communicating clutches carried by said shaft, means also actuated by said pull bars for tripping said clutches, and cam means operable from said clutches for controlling magazine selection and for restarting said signal presenting means.

16. In a linecasting and composing machine having a plurality of matrix storage magazines and a set of matrix release elements shiftable into operative association with said magazines selectively, signal presenting means, selectable elements, signal controllable means for conditioning said selectable elements, means for interrupting said signal presenting means, means for shifting said set of matrix release elements, means set in operation by said selectable elements for actuating said shifting means after a predetermined interval of operation, and means for restarting said signal presenting means a predetermined period after the initiation of the operation of said shifting means.

17. In a linecasting and composing machine having a plurality of matrix storage magazines to be shifted into effective position selectively, signal presenting means, selectable elements, signal controllable means for conditioning said selectable elements, means for interrupting said signal presenting means, magazine shifting mechanism, means set in operation by said selectable elements for activating said magazine shifting mechanism after a predetermined interval of operation, and means for restarting said signal presenting means a predtermined period after the initiation of the operation for shifting said magazines.

18. In a linecasting and composing machine, a plurality of matrix storage magazines, signal presenting means, selectable elements, signal controllable means for selecting said selectable elements to control the release of matrices from said magazines, mechanism for controlling the effectiveness of said magazines, means for interrupting said signal presenting means, means controlled by certain of said elements for initiating the operation of said mechanism during the interruption of said signal presenting means, and means controlling the restarting of said signal presenting means in timed relation to the operation of said mechanism whereby a subsequent selectable element will not be operated until after operation of said mechanism.

MAURUS T. GOETZ.